United States Patent [19]

Sawyer, Jr.

[11] 4,203,864

[45] May 20, 1980

[54] METHOD OF FORMING LOW TEMPERATURE DISPERSIONS

[75] Inventor: Edgar W. Sawyer, Jr., Hagerstown, Md.

[73] Assignee: International Telephone and Telegraph Corporation, New York, N.Y.

[21] Appl. No.: 866,094

[22] Filed: Dec. 30, 1977

Related U.S. Application Data

[63] Continuation-in-part of Ser. No. 696,142, Jun. 14, 1976, abandoned.

[51] Int. Cl.$^2$ .............................................. B01J 13/00
[52] U.S. Cl. .................................... 252/314; 71/64 C; 106/308 B; 106/308 N; 252/313 R; 252/317
[58] Field of Search ...................... 252/313 R, 70, 314; 106/308 B, 308 N

[56] References Cited

U.S. PATENT DOCUMENTS

| 2,012,232 | 8/1935 | Kline et al. | 252/313 R X |
| 2,038,724 | 4/1936 | Eichengrun | 252/70 X |
| 2,280,994 | 4/1942 | Booth | 252/313 R X |
| 2,440,601 | 4/1948 | Dickerman | 252/313 R X |
| 3,738,938 | 6/1973 | Barrett | 252/313 R X |

*Primary Examiner*—Richard D. Lovering
*Attorney, Agent, or Firm*—John T. O'Halloran; Peter C. Van Der Sluys

[57] ABSTRACT

Dispersions with lowered freezing points are provided by dissolving a dispersing agent in water, adding urea, adding a particulate inorganic solid, and then adding alcohol as a freezing point depressant. Dispersions formed in this manner can contain 20 to 75% inorganic solids in suspension without flocculating in the presence of the alcohol. Alternatively, the dispersant can be dissolved in an aqueous urea solution and the fine, particulate inorganic solid can be dispersed in the solution after which the alcohol may be added. These compositions exhibit depressed freezing points and can still be transported as a liquid at lower temperatures.

6 Claims, No Drawings

METHOD OF FORMING LOW TEMPERATURE DISPERSIONS

CROSS-REFERENCE TO RELATED APPLICATIONS

This application is a continuation-in-part of U.S. Pat. Ser. No. 696,142, filed June 14, 1976 and now abandoned.

BACKGROUND OF THE INVENTION

Attapulgite dispersions in water at 25 to 30% clay solids predispersed with TSPP (approximately 2-3% tetrasodium pyrophosphate based on the clay weight) are available from commercial sources and can be made in situ by the user. Processing in either case consists of dissolving the TSPP dispersant in water, adding the clay while agitating and continuing agitation until the major portion of the clay is dispersed. The dispersion can be used as made or can be processed to remove undispersed impurities. Other chemical agents such as small amounts of NaOH can be included as functional additives in the dispersion. They are added either before or after the incorporation of the clay.

The dispersion of attapulgite clay at 25 to 30% solids in water using condensed phosphates as dispersing agents is an old and well-known practice and has been described many times in the literature. The technique has also been described as a step in many U.S. Patents where the inventive feature has been some further treatment of the dispersion. U.S. Pat. Nos. 3,050,863, 3,509,066 and the references cited therein describe some methods of further treatment as examples.

When colloidal grades of attapulgite are used as gelling agents to stabilize suspensions or to thicken an undesirably thin aqueous system, the user often has the option as to how he will incorporate the clay into his system. He may either add the dry clay during processing and disperse it by mechanical work input or he may add predispersed clay which has been subjected to prior processing as described above. In either case the clay must end up with an extended flocculated structure in the final product to give the desired thickening or suspension effects.

The advantages of using predispersed attapulgite are that (1) the clumps of needles present in the dry colioidal clay products can be dispersed in water using a condensed phosphate dispersant with much less work input than is necessary in mechanical dispersion and (2) the efficiency of the predispersed clay in its intended use is 2 to 3 times better than that achieved in strictly mechanical dispersion. The disadvantages of predispersed clay slurries are (1) the poor economics of shipping 75% water for long-distance trips and (2) the fact that the freezing point of the dispersion is approximately 32° F. This second factor, the 32° F. freezing point, prevents the shipment and outdoor storage of predispersed slurries in many parts of the U.S. during the winter. In many parts of the country this would prevent shipment in unheated tank cars and trucks from October of one year to April of the next year. This situation has been a retarding factor in the development and use of such a desirable product.

Materials normally used as antifreezes, such as methanol, ethanol, isopropanol, ethylene glycol, propylene glycol and eutectic salt solutions, cannot be used in the above-described predispersions because they cause the predispersion to flocculate and become excessively viscous so that it can no longer be stirred or pumped. Furthermore, after such a flocculation it no longer exhibits the above-mentioned ease of use and must be redispersed mechanically for utilization.

SUMMARY OF THE INVENTION

The present invention provides a technique to overcome this inherent incompatibility of the feasible antifreeze compounds by having dissolved urea present in the particulate dispersion when the antifreeze compounds are added as a final addition.

Urea is essentially a nonionic compound and, because of its lack of ionoticity in solution, solutions of urea can be used as a dispersing media when using condensed phosphates as dispersants. The beneficial results are believed to be related to the interfacial characteristics of the urea-solution/particle surface interface which are altered by the adsorption from solution of molecular urea in such a manner that, although condensed phosphates are still capable of charging up and dispersing the solids, the antifreeze compounds (alcohols and glycols) are blocked from dehydrating the surface and causing flocculation. Since urea is a nitrogenous compound formed from carbon dioxide and ammonia, other compounds of similar chemistry are believed to provide similar beneficial results. However, urea will not prevent flocculation with eutectic salt solutions because the mechanism of flocculation of dispersed particles is different with ionic materials. When ionic materials cause flocculation the flocculation is caused by the collapse of the protective charged double layer and the adsorbed urea evidently does not prevent this phenomenon.

DESCRIPTION OF THE PREFERRED EMBODIMENT

Urea concentrations in water for use within this invention are 3 to 30% by weight of the dispersion. Particulate materials of interest include clays such as sepiolite and attapulgite (palygorskite) at concentrations of 20 to 30% solids and kaolin, calcium carbonate and titanium dioxide at concentrations of up to 65 to 75% solids. Dispersants of utility are the condensed phosphate dispersants normally used with minerals such as TSPP (tetrasodium pyrophosphate), STP (sodium tripolyphosphate), Calgon, etc. at 0.2 to 4% by weight of the solid particles. Antifreezes useable with this invention are methyl alcohol, ethyl alcohol, ethylene glycol, propylene glycol, isopropanol and desirable mixtures thereof in amounts of 9 to 30% by weight of the dispersion. The primary intended fields of interest for the inventive dispersions with depressed freezing points include suspensions of: fertilizer, soil treating material, animal feed, paint pigments and powdered coal.

Freezing point depressions in water as listed in the Encyclopedia of Chem. Tech., Kirk-Othmer, Ed. 2, Vol. 2, p. 547, for the antifreeze compounds used within this invention are:

|  | Density | Freezing Points (% by vol.) | |
|---|---|---|---|
|  |  | 20% in water | 30% in water |
| Methanol | 0.80 | +9° F. | −4° F. |
| Ethanol | 0.80 | +18° F. | +5° F. |
| Ethylene Glycol | 1.13 | +17° F. | +6° F. |

The addition of urea to water depresses the freezing points further than listed above and also modifies the freezing characteristics of the resulting solution.

To demonstrate some of the possibilities of this invention, the examples listed on Table 1 were made using a Sterling multi-mixer. The dispersants in each of the examples were dissolved in water prior to the addition of the urea and then the urea was dissolved before the dispersion was made by adding the solid particles. The antifreeze component, methanol, was added as the last ingredient in all the examples listed. p The particulate material used in the examples is Min-U-Gel 200, a colloidal attapulgite product of the Floridin Co., Pittsburgh, Pa.

To determine the feasibility of using ethanol as a freezing point depressant in accordance with this invention, the processing previously described was repeated using ethanol in place of methanol. The formulations and results shown in Table II for each of the examples listed show that ethanol can be used as an effective freezing point depressant in the urea-STP suspensions whereas methanol was effective for both urea-TSPP and urea-STP suspensions.

TABLE 1

| Ingredient Weight % | | Methanol Formulations | | | | | | | |
|---|---|---|---|---|---|---|---|---|---|
| | | Example 1 | Example 2 | Example 3 | Example 4 | Example 5 | Example 6 | Example 7 | Example 8 |
| Water | | 61.72 | 43.20 | 49.38 | 55.55 | 49.34 | 57.00 | 49.38 | 61.72 |
| TSPP | | 0.77 | 0.77 | 0.77 | 0.77 | 0.77 | — | — | — |
| STP | | — | — | — | — | — | — | 0.77 | 0.77 |
| Urea | | — | 18.52 | 12.34 | 6.17 | 12.33 | 18.00 | 12.34 | — |
| Min-U-Gel 200 | | 25.72 | 25.72 | 25.72 | 25.72 | 25.70 | 25.00 | 25.72 | 25.72 |
| Methanol | | 11.79 | 11.79 | 11.79 | 11.79 | 11.79 | — | 11.79 | 11.79 |
| | | 100.00 | 100.00 | 100.00 | 100.00 | | 100.00 | 100.00 | 100.00 |
| Comments | | Very thick | Thin | Thin-med. | Med. Thickness | *5 Drops 50% Caustic (0.07%) 100.00 | Couldn't get all of the clay in | Thin | V. thick |
| Components In Solution | | | | | | | | | |
| % Urea | | 0 | 24.92 | 16.62 | 8.31 | 16.60 | 24 | 16.62 | 0 |
| % Methanol | | 15.88 | 15.88 | 15.88 | 15.88 | 15.86 | 0 | 15.88 | 15.88 |
| Brookfield Visc., cps | | | | | | | | | |
| Initial | 10 RPM | — | 1000 | 3600 | 6000 | 5200 | — | 1500 | — |
| | 20 RPM | — | 850 | 1950 | 3200 | 2750 | — | 850 | — |
| | 50 RPM | — | 520 | 1000 | 1420 | 1400 | — | 420 | — |
| | 100 RPM | — | 300 | 560 | 820 | 740 | — | 270 | — |
| 1 Week | 10 RPM | 2500 | 1500 | 4600 | 7700 | 7000 | — | 1100 | — |
| | 20 RPM | 1500 | 1100 | 2600 | 4000 | 3800 | — | 1000 | — |
| | 50 RPM | 700 | 720 | 1080 | 1700 | 1600 | — | 600 | — |
| | 100 RPM | 490 | 530 | 630 | 960 | 930 | — | 410 | — |
| 2 Weeks | 10 RPM | 2050 | 1700 | 4850 | 8000 | 7500 | — | 600 | — |
| | 20 RPM | 1350 | 1375 | 2525 | Discarded | | — | 850 | — |
| | 50 RPM | 700 | 840 | 1120 | too thick | | — | 700 | — |
| | 100 RPM | 385 | 555 | 580 | | | — | 470 | — |
| Low Temp. Characteristics | | Slush at −15° C. | V. thin at −12° C. | — | — | — | — | V. thin at −12° C. | |

Table II

| Ingredient Weight % | | Ethanol Formulations | | | |
|---|---|---|---|---|---|
| | | Example 1 | Example 2 | Example 3 | Example 4 |
| Water | | 61.72 | 43.20 | 43.20 | 49.38 |
| TSPP | | 0.77 | 0.77 | — | — |
| STP | | — | — | 0.77 | 0.77 |
| Urea | | — | 18.52 | 18.52 | 12.34 |
| Min-U-Gel 200 | | 25.72 | 25.72 | 25.72 | 25.72 |
| Ethanol | | 11.79 | 11.79 | 11.79 | 11.79 |
| | | 100.00 | 100.00 | 100.00 | 100.00 |
| Comments | | Too thick for Et OH Couldn't formulate | V. thick | Med. | Med. to thin |
| Components in Solution | | | | | |
| % Urea | | 0 | 24.9 | 24.9 | 16.6 |
| % Ethanol | | 15.9 | 15.9 | 15.9 | 15.9 |
| Brookfield Visc. (cps) | | | | | |
| Initial | 10 RPM | — | >10,000 | 4600 | 4000 |
| | 20 RPM | — | — | 2550 | 2100 |
| | 50 RPM | — | — | 1320 | 1040 |
| | 100 RPM | — | — | 610 | 550 |
| 3 days | 10 RPM | — | ~10,000 | 1800 | 1000 |
| | 20 RPM | — | — | 1400 | 1000 |
| | 50 RPM | — | — | 800 | 700 |
| | 100 RPM | — | — | 470 | 465 |
| 1 Week | 10 RPM | — | 10,600 | 2700 | 2100 |
| | 20 RPM | — | 5800 | 1750 | 1500 |
| | 50 RPM | — | 2800 | 960 | 900 |
| | 100 RPM | — | 1800 | 590 | 560 |

Table II-continued

| Ingredient | | Ethanol Formulations | | | |
|---|---|---|---|---|---|
| Weight % | | Example 1 | Example 2 | Example 3 | Example 4 |
| 2 Weeks | 10 RPM | — | 10,000 | 4400 | 2000 |
| | 20 RPM | — | Discarded | 2650 | 1475 |
| | 50 RPM | — | | 1260 | 840 |
| | 100 RPM | — | | 680 | 510 |
| Low Temp. Characteristics | | Slush at −15° C. | — | Pourable at −12° C. | Pourable at −12° C. |

The control formulations made up with water and either dispersant including urea and M-G 200 (attapulgite clay) were low in viscosity and froze at slightly less than 0° C. and at temperatures lower than −3° C. there were many crystals formed. To determine formulations for ethylene glycol, the previous processing was followed and the examples listed in Table III were prepared. The results show good handling properties with both the urea-TSPP, and urea-STP clay suspensions with ethylene glycol at temperatures as low as −9° C.

To determine the results achievable with a low-shear mixer, the formulations shown in Table IV were made up with a Lightnin' mixer. The results indicate that both the ethanol-urea and methanol-urea compositions were pumpable as low as −12° C. (Examples 3, 4 and 5).

To determine the gelling efficiency of various predispersions, the predispersions, were evaluated as gellants for a diammonium phosphate solution (DAP) and a urea/ammonium nitrate solution (UAN). The DAP test consisted of 36 g of dispersed clay (25% dispersion) to 264 g of DAP solution (30% DAP; 70% water). The UAN test consisted of 264 g of UAN solution (35.4% urea, 44.3% ammonium nitrate, 20.3% water) to 36 g of predispersion. Mixing for each dispersion was provided by submitting each dispersion to 15 minutes in a Lightnin' mixer.

These results shown in Table V indicate that the urea-antifreeze slurries (Examples 3, 4 and 5) are generally equivalent to or better than the controls (Examples 1 and 2) in the UAN and DAP tests at 10 RPM (viscosity reading) without building up excessive readings at 100 RPM.

Table III

| Ingredient | | Ethylene Glycol Formulas | | | | |
|---|---|---|---|---|---|---|
| Weight % | | Example 1 | Example 2* | Example 3 | Example 4 | Example 5 |
| Water | | 58.87 | 58.87 (1) | 43.63 | 48.72 | 48.72 |
| TSPP | | 0.74 | 0.74 (2) | 0.74 | 0.74 | — |
| STP | | — | — | — | — | 0.74 |
| Urea | | — | — | 18.73 | 12.18 | 12.18 |
| Min-U-Gel 200 | | 24.52 | 24.52 (4) | 24.65 | 24.60 | 24.60 |
| Ethylene Glycol | | 15.87 | 15.87 (3) | 12.25 | 13.76 | 13.76 |
| | | 100.00 | 100.00 | 100.00 | 100.00 | 100.00 |
| Initial Comments | | Med. to thick | Med. | Med. | Med. | V. thin |
| Components in Solution | | | | | | |
| % Urea | | 0 | 0 | 24.86 | 16.2 | 16.2 |
| % Et. Glycol | | 21.0 | 21.0 | 16.26 | 18.3 | 18.3 |
| Brookfield Visc. (cps) | | | | | | |
| Initial | 10 RPM | 6500 | 4700 | 2550 | 4000 | 100 |
| | 20 RPM | 3300 | 2500 | 1400 | 2000 | 80 |
| | 50 RPM | 1460 | 1100 | 820 | 900 | 72 |
| | 100 RPM | 860 | 640 | 520 | 540 | 84 |
| 1 Week | 10 RPM | >10,000 | >10,000 | | | |
| | 20 RPM | | Discard | | | |
| | 50 RPM | Thickening due to intercollation | | | | |
| | 100 RPM | of the montmorillonite | | | | |
| Brookfield Visc. (cps) | | | | Gelled at −5° C., Pourable | | Thin at −5° C. |
| 1 Week at | 10 RPM | | 2600 | 4600 | — | 400 |
| −5° C. | 20 RPM | | 2600 | — | 400 | |
| | 50 RPM | | 1320 | — | 350 | |
| | 100 RPM | | 940 | — | 330 | |
| at −9° C. | 10 RPM | | 5000 | — | 300 | |
| | 20 RPM | | 3700 | — | 250 | |
| | 50 RPM | | 2440 | — | 240 | |
| | 100 RPM | | 1600 | — | 200 | |

*numbers in ( ) indicate order of addition

Table IV

| Ingredient Weight % | Example 1 (Control) | Example 2 (Control) | Example 3 | Example 4 | Example 5 |
|---|---|---|---|---|---|
| Water | 74.44 | 74.44 | 45.23 | 49.5 | 49.5 |
| TSPP | 0.74 | — | 0.77 | — | — |
| STP | — | 0.74 | — | 0.75 | 0.75 |
| Urea | — | — | 19.39 | 12.38 | 12.38 |
| Min-U-Gel 200 | 24.82 | 24.82 | 25.57 | 25. | 25. |
| Methanol | — | — | 9.05 | 12.37 | — |
| Ethanol | — | — | — | — | 12.37 |

Table IV-continued

|  |  |  |  |  |  |  |
|---|---|---|---|---|---|---|
|  |  | 100.00 | 100.00 | 100.00 | 100.00 | 100.0 |
| Comments |  | Thin | Thin | Hard to get all clay in | | |
| Components in Solution | | | | | | |
| % Urea |  | 0 | 0 | 26.0 | 16.5 | 16.5 |
| % Alcohol |  | 0 | 0 | 12.2 | 16.5 | 16.5 |
| Brookfield Visc. (cps) at 70° F.: | | | | | | |
| Initial | 10 RPM | 200 | 900 | 2000 | 500 | 2000 |
|  | 20 RPM | 175 | 800 | 1250 | 400 | 1250 |
|  | 50 RPM | 144 | 490 | 700 | 240 | 800 |
|  | 100 RPM | 130 | 375 | 400 | 175 | 545 |
| 3 Days | 10 RPM | 500 | 900 | 2500 | 450 | 1000 |
|  | 20 RPM | 475 | 850 | 1750 | 400 | 825 |
|  | 50 RPM | 410 | 640 | 940 | 340 | 580 |
|  | 100 RPM | 440 | 535 | 610 | 305 | 460 |
| Low temp. Characteristics | | Freezes ~0° C. | Freezes ~0° C. | At −12° C. slushy gel at −10° C. thin & pumpable | At −12° C. thin, pumpable | At −12° C. slushy at −5° C. thin |
| Brookfield Visc. (cps) at −5° C.: | | | | | | |
| (23° F.) | 10 RPM | — | — | 2000 | 550 | 3500 |
|  | 20 RPM | — | — | 1720 | 550 | 3500 |
|  | 50 RPM | — | — | 1320 | 510 | >2000 |
|  | 100 RPM | — | — | 990 | 570 | >1000 |

Table V

Brookfield Viscosities (cps) at RPM Shown

| Example | Formula | Test Group Table | UAN Test 10 RPM | UAN Test 100 RPM | DAP Test 10 RPM | DAP Test 100 RPM |
|---|---|---|---|---|---|---|
| 1 | TSPP (Control) | IV | 2500 | 400 | 1730 | 260 |
| 2 | STP (Control) | IV | 2300 | 350 | 1850 | 295 |
| 3 | TSPP, 26 U/12 M | IV | 3000 | 455 | 1800 | 280 |
| 4 | STP, 16.5 U/16.5 M | IV | 2500 | 365 | 1900 | 300 |
| 5 | STP, 16.5 U/16.5 E | IV | 2550 | 375 | 1800 | 280 |
| 1 | TSPP, O U/16 E (Control) | II | 3450 | 465 | 2300 | 340 |
| 2 | TSPP, 25 U/16 E (Control) | II | 3500 | 510 | 2150 | 315 |
| 3 | TSPP, 25 U/16 EG | III | 3000 | 445 | 1950 | 300 |
| 5 | STP, 16 U/18 EG | III | 3100 | 435 | 1900 | 320 |
| 1 | TSPP, O U/16 M | I | 2700 | 435 | 2000 | 305 |
| 2 | TSPP, 25 U/16 M | I | 3300 | 500 | 2000 | 310 |
| 7 | STP, 17 U/16 M | I | 2600 | 435 | 2550 | 390 |
| 3 | STP, 25 U/16 E | II | 2600 | 385 | 2000 | 305 |
| 4 | STP, 17 U/16 E | II | 2300 | 340 | 2000 | 209 |

To determine the low temperature effects on the viscosity of some of the examples containing urea, Examples 3, 4 and 5 (from Table 5), were held at 20° F. (−6.7° C.) for two weeks in a freezer. At the end of this period Examples 3 and 4 were flowable and Example 5 was very thick. Example 3 and Example 4 were pumpable and Example 5 was questionable.

The preferred embodiments previously described are presented as examples only and it is to be understood that variations in concentrations may be made by those skilled in the art. While the examples are directed to attapulgite clay dispersions, dispersions of other minerals and particulate inorganic solids such as sepiolite, kaolin, calcium carbonate, coal dust and titanium dioxide show the same properties of freezing point depression when dispersed in urea solutions. Dispersants such as TSPP, STP, other condensed-phosphate sodium salts, sodium polyacrylates, sodium polymethacrylates, functional blends of the above dispersants, and TSPP/sodium naphthylene-formaldehyde sulfonate blends do not cause the aforementioned materials to drop out of suspension when anti-freeze additives such as methanol, ethanol and ethylene glycol are added to the urea solution.

Examples of other clay dispersions include sepiolite, attapulgite, or palygorskite particles at concentrations of 20 to 30% by weight of dispersion, 1 to 4% dispersant by weight of the solid particles, urea in an amount equal to 3 to 30% by weight of the dispersion, antifreeze in an amount equal to 9 to 30% by weight of the dispersion and water. The preferred concentrations include 2 to 3% dispersant by weight of solid particles and 15 to 30% urea by weight of the dispersion.

When using kaolin, titanium dioxide or calcium carbonate, the particle concentration may be increase up to 65 to 75% by weight of the dispersion while using only 0.2 to 1% dispersant by weight of the solid particles. The preferred dispersant concentration is in the range of 0.2 to 0.3% by weight of the solids and the preferred urea concentration is again 15 to 30% by weight of the dispersion.

The concentration of antifreeze can generally be varied between 9 to 30% by weight of the dispersion with higher concentrations being uneconomical and lower concentrations not being very meaningful.

In addition to the above described method of preparing the dispersion, the urea may first be mixed into the water, followed by the dissolving of the dispersant after which the solids may be mixed into the dispersion with the final step being the addition of the antifreeze.

Although the invention is directed to water suspensions of materials, it is to be understood that other liquid suspending means and other particulate materials readily fall within the scope of the invention.

What is claimed is:

1. A method of forming an aqueous dispersion of solid particles having a depressed freezing point, comprising the steps of:
   dissolving a condensed phosphate dispersant in water in an amount equal to 0.2 to 4.0% by weight of solid particles to be added;
   mixing urea into the water containing the dispersant in an amount equal to 3 to 30% by weight of the dispersion;
   adding solid particles to the mixture in an amount equal to 20 to 75% by weight of the dispersion; and
   adding an antifreeze solution selected from the group consisting of methanol, ethanol, isopropanol, ethylene glycol and propylene glycol to the dispersion in an amount equal to 9 to 30% by weight of the dispersion to depress the freezing point of the dispersion without flocculating the solid particles.

2. A method as described in claim 1, wherein the solid particles comprise a clay selected from the group consisting of sepiolite, attapulgite, palygorskite and kaolin.

3. A method as described in claim 1, wherein the solid particles are selected from the group consisting of calcium carbonate and titanium dioxide.

4. A method of forming an aqueous dispersion of solid particles having a depressed freezing point, comprising the steps of:
   mixing urea into water in an amount equal to 3 to 30% by weight of the dispersion;
   dissolving a condensed phosphate dispersant in the urea water mixture in an amount equal to 0.1 to 4.0 by weight of the solid particles to be added;
   adding solid particles to the mixture in an amount equal to 20 to 75% by weight of the dispersion; and
   adding an antifreeze solution selected from the group consisting of methanol, ethanol, isopropanol, ethylene glycol and propylene glycol to the dispersion in an amount equal to 9 to 30% by weight of the dispersion to depress the freezing point of the dispersion without flocculating the solid particles.

5. A method as described in claim 4, wherein the solid particles comprise a clay selected from the group consisting of sepiolite, attapulgite, palygorskite and kaolin.

6. A method as described in claim 4, wherein the solid particles are selected from the group consisting of calcium carbonate and titanium dioxide.

* * * * *